Aug. 21, 1934.  O. A. WIBERG  1,970,992
BEARING DEVICE FOR ROTARY BODIES
Filed Jan. 3, 1931
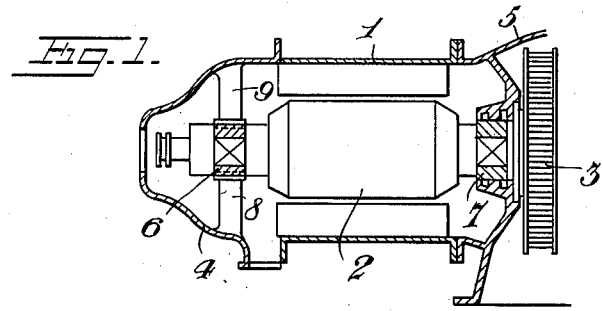
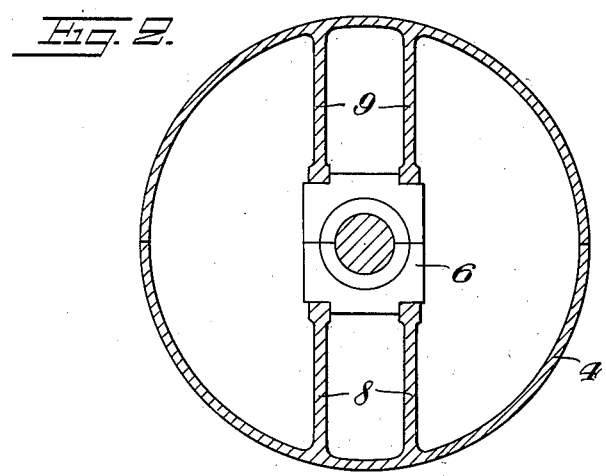
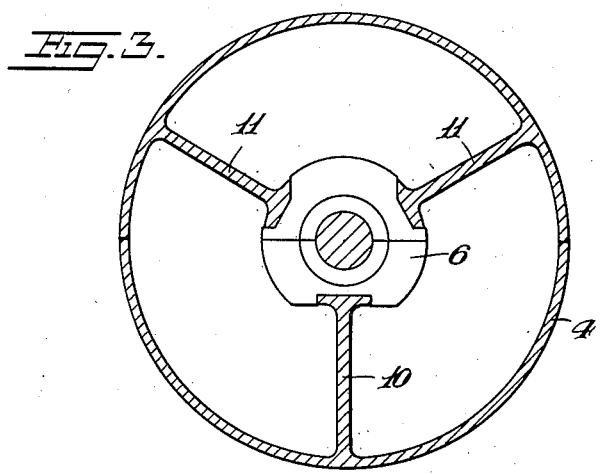
Inventor
Oscar A. Wiberg
By Henry Orth Atty.

Patented Aug. 21, 1934

1,970,992

UNITED STATES PATENT OFFICE 1,970,992

BEARING DEVICE FOR ROTARY BODIES

Oscar Anton Wiberg, Finspong, Sweden

Application January 3, 1931, Serial No. 506,430
In Sweden November 7, 1929

3 Claims. (Cl. 308—22)

It is well-known that, in a rotary body which is mounted in rigid bearings, the portion of the body situated between the bearings will have a tendency of deflection due to the impossibility of balancing the rotary body in an absolutely exact manner. Said tendency will increase up to the critical number of revolutions at which the deflection reaches its maximum and after having passed this maximum the rotary body will assume another axis of rotation so that the vibrations caused by said deflection will cease. Said deflection may in certain cases give rise to damage, for instance, if the shaft of the rotary body carries the blading of a radial flow turbine outside of any of the bearings. According as the portion of the rotary body situated between the bearings deflects, the portion of the shaft situated outside of said bearing will also deflect though in the opposite direction to the direction of deflection of said intermediate portion. That surface of the turbine disc carrying the blades which is perpendicular to the shaft at rest will tend, even during the rotation, to move to a position at right angles to the shaft and, according as the shaft deflects, said surface of the turbine disc will, consequently, form a still greater angle with respect to the original direction of the shaft. In turbines comprising two oppositely rotating turbine discs carried by separate shafts and in which the blades of one disc engage the spaces between the blades of the opposite disc a deflection of the character above referred to may easily give rise to touching and wear of all packing edges, especially due to the fact that the clearances between the blades of such turbines are exceedingly small. As the deflection will reach its maximum at the critical number of revolutions, as already stated, it is evident that said risk of touching will be the greater the higher the critical number of revolutions. As another fact of interest it may be mentioned that the duration of said risk will be longer at a higher critical number of revolutions than at a lower number of revolutions. Furthermore, it is to be noted that the vibrations are more detrimental, as far as the strength is concerned, at higher numbers of revolutions than at lower ones.

The object of this invention is to overcome or reduce said drawbacks. The invention is characterized, chiefly, by the fact that, in the case of a rotary body the shaft of which is mounted in two bearings and carries another body outside one of said bearings, the bearing which is common to said bodies is rigidly arranged, whereas the other bearing is yieldingly mounted. The yielding mounting of said bearing will result in a reduced deflection of the shaft. Moreover, the critical number of revolutions of the shaft will also be reduced as result of said yieldable mounting and this, in turn, will still more reduce the deflection. It is true that, normally, the damping effect will be reduced with reduced number of revolutions, but on the other hand, this reduction of the damping will be balanced to a more or less high degree by the yieldable mounting according to this invention. As a whole, it may be said that the elastic mounting of the bearing under consideration will prevent the formation of resonance between the vibration due to bending and the natural vibration and will in this way suppress the formation of any marked maximum of deflection.

In the accompanying drawing Fig. 1 is a side elevation, partially in section, of a turbine with associated generator the rotor of which is mounted according to this invention. Fig. 2 is a cross section on a larger scale of one bearing of the rotor. Fig. 3 is a cross section of a modified embodiment of said bearing.

The turbo-generator shown in Fig. 1, which may be thought to be one half of a turbo-generator having disks and blades rotating in opposite directions, comprises the stator 1, the rotor 2, and the turbine rotor blading 3. The stator 1 is rigidly connected on one side to the end covering 4 and on the other side to the casing 5 of the turbine. The rotor 2 is mounted in two bearings 6 and 7 of which the former is situated in the end covering 4 and the latter in the turbine casing 5. The blading 3 is carried by the rotor shaft outside of the bearing 7 and thus overhung. The bearing 7 which is common to the rotor and to the blading is rigidly mounted, whereas the bearing 6 is movable to some extent, in as much as it is supported by resilient members 8 and 9. Said members are more clearly shown in Fig. 2. The end covering 4 is made in two parts jointed along a horizontal plane, as will appear from Fig. 2, and, similarly, the bearing 6 comprises two halves. The lower half portion of the bearing is held in place by the resilient members 8 and the upper by the resilient members 9. The resilient members 8 and 9 are formed integral with the lower and upper halves of the end covering, respectively. The members 8 and 9 are all arranged vertically and of such a design as to allow a displacement of the bearing in lateral direction which is greater than the slight displacement in vertical direction which is due to the pressure of the bearing against and along with the resilient members. The said last-mentioned pressure which is due to the centrifugal force will cause the end covering 4, which is flexible to some extent, to remove the members 8 and 9 from each other, thereby increasing the vertical displacement of the bearing. It is to be noted that the elasticity of the members or the elasticity of the end covering may be so adjusted that the movement of the bearing in vertical direction may be greater than the movement of the bearing in lateral direction.

The above described elastic mounting of the bearing 6 remote from the blading will result in the reduction of the deflection and the reduction of the critical number of revolutions as set forth in the preamble of this description. Let it be assumed, for instance, that the critical number of revolutions be at about 2000 revolutions per minute in case of a rigid arrangement of both bearings, then it will be seen that, with an arrangement of the bearing 6 as above described, the critical number of revolutions will come to lie at about 1200 revolutions per minute. It has been proved that at 1300 revolutions per minute the rotor will run quietly and without vibrations, whereas in case of two rigid bearings the same effect would first be obtained at 2100 revolutions per minute. It is evident that a deflection which reaches its maximum at 2000 revolutions per minute will be considerably larger than a deflection which reaches its maximum at 1200 revolutions per minute, particularly because the action of the centrifugal force will increase with increased number of revolutions and increased diameter. It is true that the movable bearing will have a certain vertical displacement also which will increase the deflection of the rotor shaft from its theoretical axis by an amount which is approximately equal to half the displacement of the bearing as reckoned from a point midway between the ends of the rotor. This additional deflection, however, will be the smaller, the less is the distance from the rigid bearing, where it will be equal to nil, to then again grow larger on the opposite side of the bearing. As the journal carrying the turbine blading is very short, that is to say, the distance from the blading to the bearing is very small, the deflection due to the movable bearing will in this case also be reduced considerably. The only bending of the journal is, consequently, due to the centrifugal force and will thus decrease with decreased number of revolutions.

The device above described is, of course, of importance only in connection with machines which run at a number of revolutions above the critical one.

Each body, when caused to rotate, will tend to rotate about its principal axis. In order to overcome this tendency in the case under consideration the movable bearing may be mounted so as to be capable of different movement in different directions. A certain mobility in a given direction will always result in a definite critical number of revolutions and, in case of different mobility in several directions, the resulting critical speed will be composed of said individual speeds. If the velocities are in resonance the rotation of the body about the principal axis will not be counteracted, but if they are not in resonance, such a counteraction will take place. This is true of the arrangement shown in Fig. 2, as will appear from the description hereinbefore given, because said design will secure a certain mobility in vertical direction and another mobility in horizontal direction.

Fig. 3 illustrates a modified design in which the same result may be obtained by the use of three resilient members only to support the bearing 6, viz. one vertical, lower resilient member 10 upstanding from the lower half of the end covering 4 to support the lower half of the bearing and two resilient members 11 depending in an oblique direction from the upper half of the end covering 4 to maintain the upper half of the bearing in place. The members 10 and 11 may be of different thickness and resilience in conformity with the desired value of the critical number of revolutions.

It is to be noted that other modifications may also be made without departing from the scope or idea of the invention.

Of course, the invention may be applied to all kinds of rotary bodies and is not limited to rotors of electrical machines.

What I claim is:—

1. A bearing mounting for rotary shafts comprising, a fixed bearing, a movable bearing spaced from the fixed bearing, a horizontal shaft rotatably mounted in said bearings, said shaft having a free end portion projecting beyond the fixed bearing, a rotor carried on the free end portion of the shaft, a second rotor carried by the shaft between said bearings, and a resilient support for said movable bearing yieldable to transverse forces of the shaft in all transverse directions.

2. A bearing mounting for rotary bodies comprising, a rigid casing having a fixed bearing, a resilient casing mounted on the rigid casing, a movable bearing spaced from the fixed bearing, resilient arms supporting the movable bearing in the resilient casing, a horizontal shaft rotatably mounted in said bearings and having a free end portion projecting beyond the fixed bearing, a rotor carried by the projecting portion of said shaft, a second rotor carried by said shaft between said bearings, the resilient casing and resilient bearing supporting arms allowing the movable bearing to yield to transverse forces of the shaft.

3. A bearing mounting for rotary bodies comprising, a rigid casing having a fixed bearing, a resilient casing mounted on the rigid casing, a movable bearing spaced from the fixed bearing, resilient arms of different resilience supporting the movable bearing in the resilient casing, a horizontal shaft rotatably mounted in said bearings and having a free end portion projecting beyond the fixed bearing, a rotor carried by the projecting portion of said shaft, a second rotor carried by said shaft between said bearings, the resilient casing and resilient bearing supporting arms allowing the movable bearing to yield to transverse forces of the shaft to different degrees in different directions.

OSCAR ANTON WIBERG.